(12) United States Patent
Zhang et al.

(10) Patent No.: US 7,930,388 B2
(45) Date of Patent: Apr. 19, 2011

(54) BLADE SERVER MANAGEMENT SYSTEM

(75) Inventors: Danfeng Zhang, Beijing (CN); Shigui He, Beijing (CN); Yan An, Beijing (CN); Naihua Huang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 411 days.

(21) Appl. No.: 11/966,592

(22) Filed: Dec. 28, 2007

(65) Prior Publication Data

US 2008/0162691 A1  Jul. 3, 2008

(30) Foreign Application Priority Data

Dec. 31, 2006  (CN) .......................... 2006 1 0171618

(51) Int. Cl.
*G06F 15/173* (2006.01)
(52) U.S. Cl. .................................. 709/224; 709/208
(58) Field of Classification Search .................. 709/208, 709/224
See application file for complete search history.

(56) References Cited

U.S. PATENT DOCUMENTS

| | | | | |
|---|---|---|---|---|
| 7,512,830 B2* | 3/2009 | Chu et al. | ........................... | 714/4 |
| 7,657,677 B2* | 2/2010 | Huang et al. | .................. | 710/100 |
| 2003/0188222 A1* | 10/2003 | Abbondanzio et al. | ......... | 714/12 |
| 2004/0024831 A1* | 2/2004 | Yang et al. | ...................... | 709/208 |
| 2004/0153697 A1* | 8/2004 | Chang et al. | ....................... | 714/4 |
| 2004/0215617 A1* | 10/2004 | Ramsey et al. | .................. | 707/10 |
| 2004/0255189 A1* | 12/2004 | Chu et al. | ......................... | 714/13 |
| 2005/0076107 A1* | 4/2005 | Goud et al. | ...................... | 709/223 |
| 2005/0138439 A1* | 6/2005 | Rothman et al. | ............... | 713/300 |
| 2006/0218326 A1* | 9/2006 | Tanaka | ........................... | 710/104 |
| 2007/0027948 A1* | 2/2007 | Engebretsen | ................. | 709/203 |
| 2007/0234032 A1* | 10/2007 | Chen et al. | ...................... | 713/100 |
| 2008/0126627 A1* | 5/2008 | Chandrasekhar et al. | ....... | 710/62 |
| 2008/0204448 A1* | 8/2008 | Dawson et al. | ................ | 345/419 |
| 2009/0158161 A1* | 6/2009 | Gibbs et al. | ..................... | 715/733 |
| 2010/0050100 A1* | 2/2010 | Dettinger et al. | .............. | 715/764 |

* cited by examiner

*Primary Examiner* — Shawki S Ismail
(74) *Attorney, Agent, or Firm* — Dickstein Shapiro LLP

(57) ABSTRACT

The present invention discloses a blade server management system comprising a plurality of management subsystems provided on each blade in a blade server and connected to each other via a local area network, each of which implements remote control and self-management for the corresponding blade, and said management subsystems including at least one master management subsystem for monitoring the operation parameters of the blade server through a monitoring subsystem; a communication subsystem provided on a backboard for connecting a external network and said local area network made up of said management subsystems; and a monitoring subsystem provided on the backboard and connected to said management subsystems for monitoring the operation parameters of the blade server based on a command from the master management subsystem. The blade server management system of the present invention has high system reliability and stability as well as a simple routing design while reducing the complexity of system design.

7 Claims, 2 Drawing Sheets

BLADE SERVER MANAGEMENT SYSTEM

BACKGROUND OF THE INVENTION

1. Field of Invention

The present invention relates to a blade server management system, and in particular to a blade server management system which can reduce design complexity while improving system reliability and stability.

2. Description of Prior Art

The existing blade server management system has generally the disadvantages of complex design and difficult implementation, thereby leading to such problems as a long develop cycle, a high design cost and adversity in popularization.

FIG. 1 shows the known blade server management system comprising two system management modules, simple management modules, a KVM switching module, a sensor (or a single-chip set), a switch and a plurality of monitoring units, such as a fan monitoring unit and power supply monitoring unit.

Both of the system management modules can implement remote control management, have the functions of KVM (abbreviation for Keyboard, Video and Mouse), USB redirection, IDE redirection and the like, and the simple management modules are provided on each of the blades.

One of the two system management modules serves as the master system management module responsible for the remote control management, and the other serves as a backup, and replaces the master system management module as a new system management module when the master system management module fails.

Unfortunately, the above-mentioned blade server management system has the following disadvantages.

1. The system cannot implement remote management any more when both of the system management modules have fails, and thus has poor reliability and stability.

2. The routing design on the backboard is complex while having difficulty in heat dissipation.

SUMMARY OF THE INVENTION

The object of the present invention is to provide a blade server management system which can reduce the system design complexity while improving system reliability and stability.

In order to achieve the above object, the present invention provides a blade server management system comprising:

management subsystems provided on each blade in the blade server and connected to each other via a local area network, each of which implements remote control and self-management for the corresponding blade, and the management subsystems including at least one master management subsystem for monitoring the operation parameters of the blade server through a monitoring subsystem;

a communication subsystem provided on a backboard for connecting an external network and the local area network made up of the management subsystems; a monitoring subsystem provided on the backboard and connected to the management subsystems for monitoring the operation parameters of the blade server based on a command from the master management subsystem.

In the above blade server management system, the monitoring subsystem may connect to the management subsystems via RS485, I2C or CAN-BUS.

In the above blade server management system, the communication subsystem may be a hub, a switch or a router.

In the above blade server management system, each of the management subsystems comprises:

a communication interface module for providing the communication interface to both the communication subsystem and the monitoring subsystem;

a KVM module connected to the communication interface module for providing the interface functions of keyboard, display and mouse;

a baseboard management controller (BMC) module connected to both the communication interface module and the monitoring subsystem for monitoring the operation parameters of the blade server through the monitoring subsystem and providing management and remote control for the corresponding blade;

a redirection module connected to the communication interface module for providing the functions of USB redirection and IDE redirection.

In the above blade server management system, the master management subsystem is determined by competing, arbitrating or enumerating in a software manner.

In the above blade server management system, the master management subsystem is specified through remote control.

In the above blade server management system, the operation parameters of the blade server include temperature, CPU status, fan speed and voltage.

In the above blade server management system, the master management subsystem is always in an operating status.

The blade server management system of the present invention has the following advantages.

1. Since each blade is provided with its own management subsystem, the redundant support thereof exceeds that of the blade server management system in prior art to a great extent, thereby enhancing the reliability and stability of the whole system.

2. Wiring becomes easier as obviously illustrated with the comparison between FIGS. 1 and 2.

3. The administrator can make a direct access to the management subsystems from a remote end. Thus, the KVM switching module can be omitted, and the system design is further simplified.

DETAILED DESCRIPTION OF PREFERRED EMBODIMENTS

Figure 1:
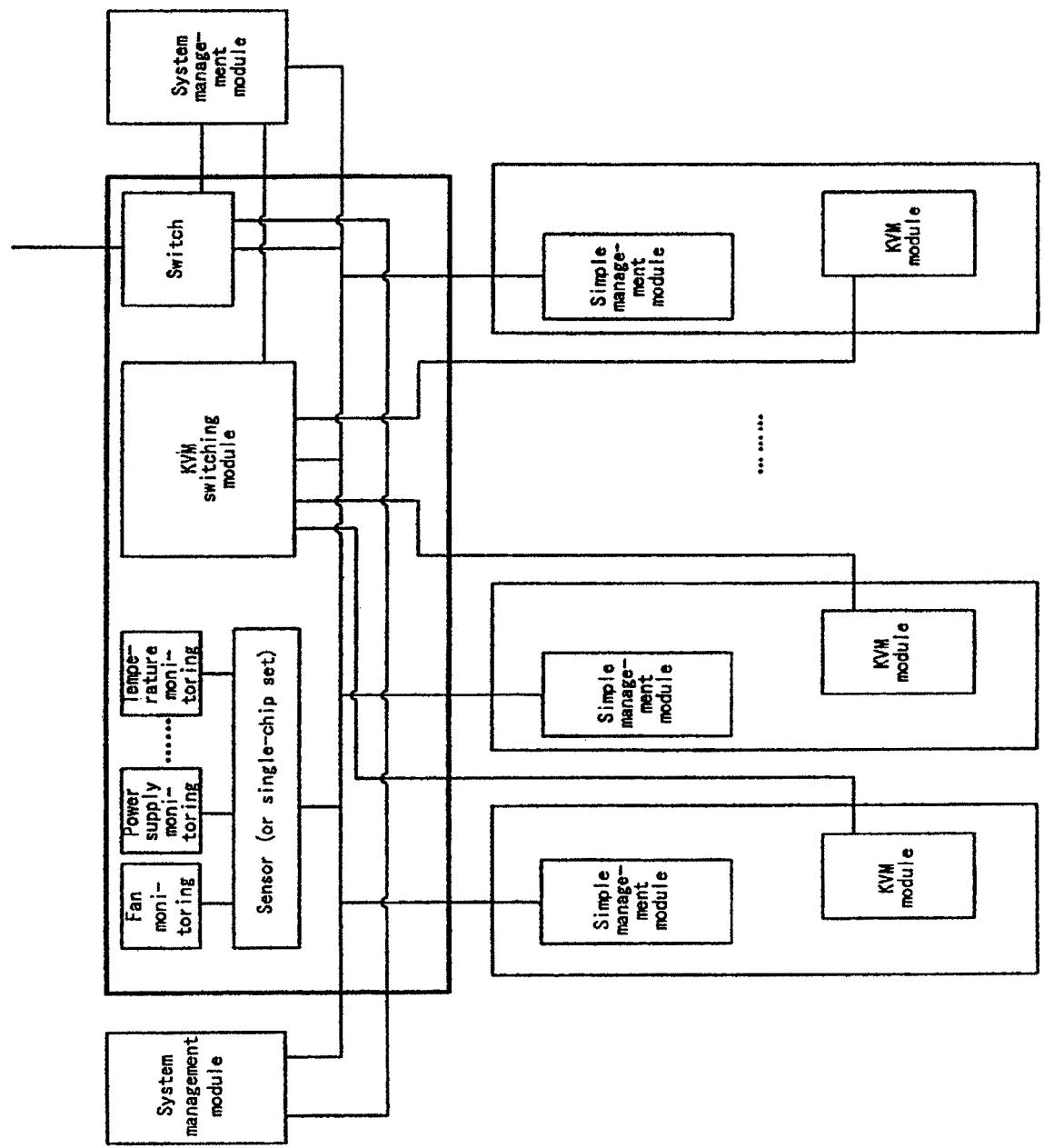
FIG. 1 is a schematic block diagram showing the blade server management system in prior art.
Figure 2:
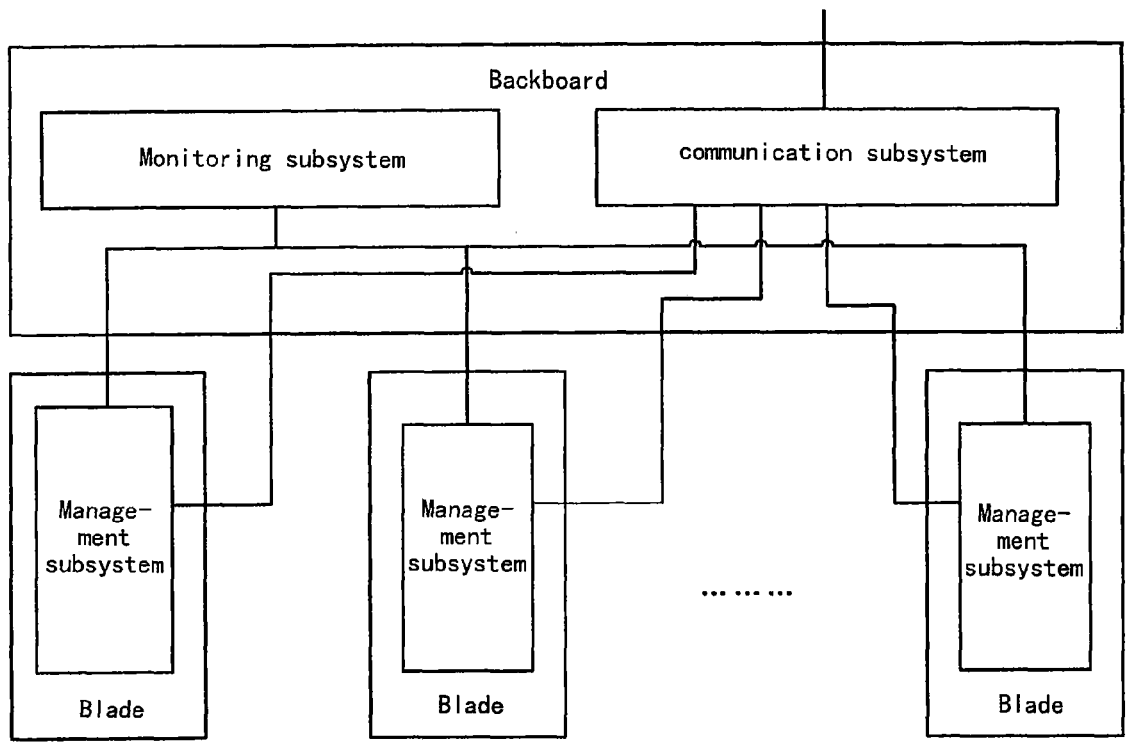
FIG. 2 is a schematic block diagram showing a blade server management system according to an embodiment of the present invention.

FIG. 2 shows a blade server management system according to an embodiment of the present invention. The blade server management system of the embodiment comprises management subsystems, a communication subsystem, a monitoring subsystem and a backboard.

The management subsystems are provided on each blade in the blade server respectively and connected to each other via a local area network. Each of the management subsystems implements remote control and self-management for the corresponding blade, and one of the management subsystems is the master management subsystem for monitoring the operation parameters of the blade server through a monitoring subsystem. The communication subsystem is provided on the backboard and configured to connect an external network and the local area network made up of the management subsystems. The monitoring subsystem is provided on the backboard, connected to the management subsystems, and configured to monitor the operation parameters of the blade server based on a command from the master management subsystem.

The self-management for the corresponding blade by each of the above management subsystems is to manage a monitoring module placed on the blade. Such management includes monitoring and controlling over a series of operation parameters of the blade, such as the temperature of the blade. Description of this part will be omitted since it is exactly the same as that of the blade server management system in prior art.

Now, more detailed explanation will be given to the respective subsystems in the blade server management system.

When each management subsystem conducts communication with the outside via the communication subsystem, the data are network-packetized and then transported.

In the particular embodiment of the present invention, the monitoring subsystem communicates with only the master management subsystem, while it can also communicate with any management subsystem other than the master management subsystem by using multi-Master. In consideration of the system reliability and stability, the scheme in which the monitoring subsystem communicates with only the master management subsystem is adopted in the particular embodiment of the present invention.

The communication between the monitoring subsystem and the management subsystem can be carried out by use of RS485, I2C, CAN-BUS or any other suitable approach.

The communication subsystem may be a hub, a switch, a router or the like that is placed on the backboard and connects an external network and the local area network made up of these management subsystems.

According to the above architecture of the blade server management system of the present invention, by providing each management subsystem on the corresponding blade and connecting all the management subsystems via the local area network, the administrator on a remote end can access any of the management subsystems directly via the communication subsystem, and implement remote control (e.g., power on, power off, power supply management, system installation configuration, etc.) over each blade by means of the remote control function possessed by each management subsystem. Therefore, it is unnecessary for the blade server management system of the present invention to provide a KVM switching module.

Meanwhile, since each blade is provided with its own management subsystem, and only one master management subsystem is needed to conduct the monitoring function in the whole blade server management system, it is necessary to select one from all the management subsystems as the master management subsystem.

Here, in the particular embodiment of the present invention, the master management subsystem is selected from the management subsystems in one of the following approaches.

The first approach is to select one management subsystem as the master management subsystem by competing, arbitrating or enumerating in software. When some malfunction occurs in the current master management subsystem, the other management subsystems can intelligently detect such occurrence, one of them will be selected as the new master management subsystem through competition, arbitration or enumeration.

The second approach is to specify the master management subsystem through remote control.

The arbitration or enumeration in software for selecting the master management subsystem can be conducted through various methods, and these methods should not be construed as the limitation to the present invention. Here, only one simple scheme is introduced by the way of example as follows.

Since all the management subsystems are located on the local area network, each of them is allocated with a corresponding IP address. Each management subsystem makes a poll on all IP addresses present in the local area network every certain time period and ranks the IP addresses in an ascending order. All the management subsystems consider by default that one having the minimum IP address is the master management subsystem, and the management subsystem which finds out that its IP address is the smallest will take the position of the master management subsystem to be responsible for the monitoring management of the overall blade server. When this master management subsystem breaks down, its IP address becomes invalid. A new master management subsystem will be determined since other management subsystems polls and ranks the IP addresses every certain time period.

Since there are usually ten or more blades in a single blade server, the architecture of the blade server management system of the present invention provides far more than two redundant supports to the management systems, which enhances significantly the reliability and stability of the blade server management system and prevents some abnormalities, such as inability to implement remote control, inability to monitor the machine cabinet, occurring in the overall management system due to the failure of two of the management subsystems.

Figure 3:
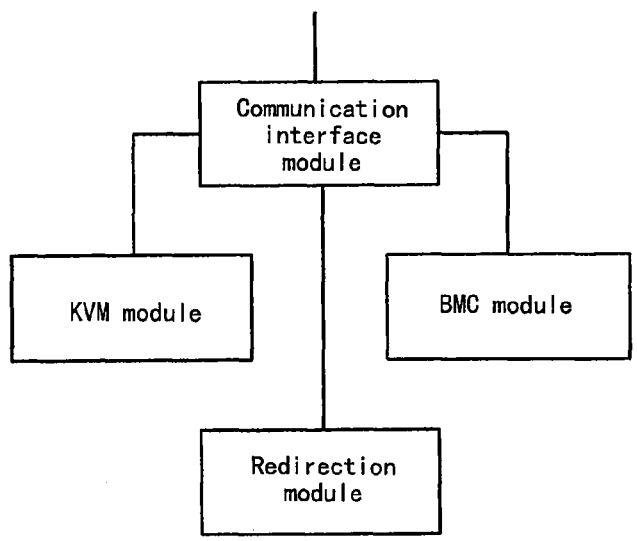
FIG. 3 is a block diagram showing a management subsystem in the blade server management system of the present invention.

As shown in FIG. 3, each of the management subsystems comprises a communication interface module, a KVM module, a baseboard management controller (BMC) module, and a redirection module.

The communication interface module provides the communication interface to both the communication subsystem and the monitoring subsystem. The KVM module connects to the communication interface module for providing the interface functions of keyboard, display and mouse. The baseboard management controller (BMC) module connects to both the communication interface module and the monitoring subsystem. The BMC module in the master management subsystem is used to monitor the operation parameters (e.g., temperature, CPU status, fan speed and voltage) of the blade server through the monitoring subsystem and provides for the corresponding blade the control over power on/off, power supply management, BIOS configuration and remote access to control panel information of the operating system. The BMC module may be a separate processor and being always in an operating status regardless of the status of the master processor. The redirection module connects to the communication interface module for providing the functions of USB redirection and IDE redirection.

After implementing remote connection with the management subsystem via the communication subsystem, the administrator utilizes the respective modules in the management subsystem to, for the corresponding blade, control power on/off and power supply management, monitor environment conditions such as temperature, voltage and fan, and control functions like system installation configuration.

The BMC module involves an IPMI (Intelligent Platform Management Interface), which enables the operating system of the blade server to acquire information necessary for a normal operation of the system and to control the hardware in the system. For example, the IPMI enables a sensor monitoring (e.g., temperature, fan speed and voltage) as a detection of trouble symptom. An example is given as follows.

If the temperature of the blade server exceeds a prescribed value, the operating system of the server will instruct the BMC module to increase the fan speed or reduce the processor speed, and the BMC module will further carry out the corresponding operation by controlling the monitoring subsystem.

The monitoring subsystem includes a sensor (or a single-chip set) and an execution module. The sensor (or single-chip set) is connected to the BMC module. The execution module monitors the operation parameters of the blade server, such as fan rotating speed and temperature, and includes a fan monitoring module, temperature monitoring module and a power supply monitoring module.

The foregoing description gives only the preferred embodiment of the present invention. It should be understood that, to those ordinarily skilled in the art, various improvements and modifications can be made within the principle of the present invention and should be encompassed by the scope of the present invention.

What is claimed is:

1. A blade server management system comprising:
    a plurality of management subsystems, provided on each blade in a blade server and connected to each other via a local area network, each of which implements remote control and self-management for the corresponding blade, said management subsystems including at least one master management subsystem;
    a communication subsystem, provided on a backboard, for connecting an external network and said local area network made up of said management subsystems; and
    a monitoring subsystem, provided on the backboard and connected to said management subsystems, for monitoring the operation parameters of the blade server based on a command from the master management subsystem,
    wherein the master management subsystem monitors the operation parameters of the blade server through said monitoring subsystem,
    wherein each of the management subsystems comprises:
    a communication interface module for providing the communication interface to both the communication subsystem and the monitoring subsystem;
    a KVM module, connected to the communication interface module, for providing the interface functions of keyboard, display and mouse;
    a baseboard management controller module, connected to both the communication interface module and the monitoring subsystem, for monitoring the operation parameters of the blade server through the monitoring subsystem and providing management and remote control for the corresponding blade; and
    a redirection module, connected to the communication interface module, for providing the functions of USB redirection and IDE redirection.

2. The blade server management system according to claim 1, wherein said monitoring subsystem connects to the management subsystems via RS485, I2C or CAN-BUS.

3. The blade server management system according to claim 1, wherein said communication subsystem is a hub, a switch or a router.

4. The blade server management system according to claim 1, wherein said master management subsystem is determined by competing, arbitrating or enumerating in a software manner.

5. The blade server management system according to claim 1, wherein said master management subsystem is specified through remote control.

6. The blade server management system according to claim 1, wherein the operation parameters of the blade server include temperature, CPU status, fan speed or voltage.

7. The blade server management system according to claim 1, wherein said master management subsystem is always in an operating status.

* * * * *